Figure 1:
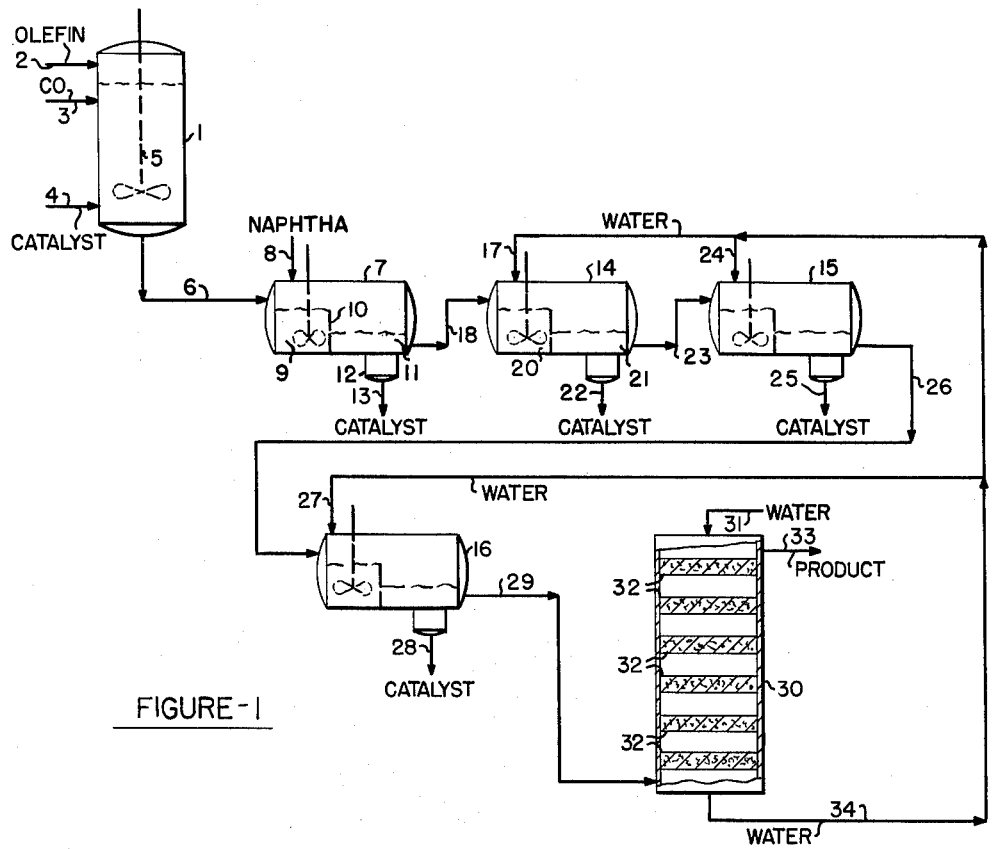

July 26, 1966   A. H. WEHE, JR., ETAL   3,262,954
ACID HYDROLYSIS PROCESS
Filed Jan. 21, 1963

Albert H. Wehe, Jr.
Henry G. Ellert
Raymond C. Lohman
Worthy T. Boyd

Inventors

By W. N. Wright

Patent Attorney

United States Patent Office 3,262,954
Patented July 26, 1966

3,262,954
ACID HYDROLYSIS PROCESS
Albert Henry Wehe, Jr., Henry George Ellert, Raymond Carroll Lohman, and Worthy Truman Boyd, Baton Rouge, La., assignors to Esso Research and Engineering Company, a corporation of Delaware
Filed Jan. 21, 1963, Ser. No. 252,723
6 Claims. (Cl. 260—413)

This invention concerns the production of carboxylic acids by the two-step reaction of an olefinically unsaturated compound, water and carbon monoxide, using a hydrated boron fluoride catalyst. In the first step of the process, the olefinic compound and carbon monoxide are reacted with the hydrated boron fluoride catalyst to form a complex of these reactants. In the second step of the process, the complex referred to is hydrolyzed to free the carboxylic acid product. The present invention particularly concerns the procedure for hydrolyzing the complex so as to permit complete recovery of the acid catalyst from the carboxylic acid products of the process. The invention specifically concerns a staged hydrolysis process, enabling complete recovery and reconstitution of the hydrated boron fluoride catalyst, permitting direct reuse of the catalyst in the synthesis process.

It has been known that carboxylic acids may be synthesized by the reaction of water, carbon monoxide and olefins using a highly acid, inorganic acid catalyst such as hydrated boron fluoride.

The process described can be considered a two-stage synthesis process. The basic reaction involves the combination of one mole of the olefinic feed stock with one mole of water and one mole of carbon monoxide to provide the carboxylic acid product having one more carbon atom than the olefin feed stock. In carrying out this process in two stages, the first stage involves reaction of the olefinic compound with carbon monoxide and the hydrated boron fluoride catalyst in the absence of any added water. An exothermic reaction occurs with the formation of what may be called a complex of the hydrated boron fluoride catalyst, the carbon monoxide, and the olefin compound. In the second step of the two-stage process, it is then necessary to hydrolyze this complex using about one mole of water. While greater amounts of water may be employed, this is unnecessary and would necessitate reconcentration of the diluted boron fluoride catalyst obtained. In the event the boron fluoride catalyst employed initially contains somewhat more than two moles of water, somewhat less than one mole of water may successfully be used for the hydrolysis step. Nevertheless, in a lined out operation in which catalyst is recovered having the same constitution as catalyst fed to the first stage of the process, it is necessary to use one mole of added water for the hydrolysis of the complex referred to.

The preferred catalyst for use in the process of this invention is a hydrated boron fluoride catalyst having the empirical formula: $BF_3 \cdot XH_2O$, where X equals about 2 to 2.5. Such catalysts involve the combination or complexing of boron fluoride with water so as to form definite chemical compounds including those corresponding to the empirical formula of boron fluoride monohydrate and boron fluoride dihydrate, and which may include additional quantities of water which may be present as a solvent, or may complex or otherwise react with the boron fluoride in other ratios. Such catalysts are referred to herein as "hydrated boron fluoride catalysts." While different quantities of water may be employed in such catalysts, it is particularly preferred in the practice of this invention to use a boron fluoride catalyst containing about 2 to 2.5 moles of water per mole of boron fluoride, and particularly a catalyst containing about 2 moles of water per mole of boron fluoride. Greater water contents may be used but are not required and would involve additional process complexities to permit recovery or reconstitution of the desired catalyst. Lower water contents are impractical since the hydrated boron fluoride catalyst cannot be recovered in the hydrolysis system of this invention unless combined with about 2 moles of water.

Optionally, however, the hydrated boron fluoride catalyst may be used in combination with other inorganic acid catalysts. Sulfuric acid or phosphoric acid in particular may usefully be employed with the hydrated boron fluoride catalyst. The relative proportions of the acids employed may be varied, although use of approximately equal molar amounts of boron fluoride and phosphoric acid or sulfuric acid is preferred.

The process of this invention may be used for the preparation of carboxylic acids from any monoolefinic compound containing 3–20 carbon atoms. The olefin feed stock can comprise straight or branched chain alkenes including propylene, butylene, pentene, and the higher homologues and isomers of these alkenes. The olefins of this class can constitute either terminal or internal unsaturated alkenes. Similarly, cyclic olefins having up to 20 carbon atoms may be employed as the feed stock, including cyclopentene, cyclohexene, and the higher homologues. Any desired mixtures of these compounds such as the $C_4$ fraction recovered in petroleum refining operations may be used if desired. All of these monoolefinic compounds can include functional groups such as carboxylic acid, ester, or alcohol groups.

The acid synthesis process may be conducted at temperatures within the range of about $-4°$ F. up to $302°$ F. although the preferred temperature is in the range of 68–212° F. Elevated pressures are required in order to maintain a high carbon monoxide partial pressure. Pressures of 10 to 600 atmospheres or more can be employed, although it is preferred to use a pressure of about 40 to 100 atmospheres.

The process may be conducted in either a semi-batch or continuous fashion. In a semi-batch process, the liquid, inorganic acid catalyst is first introduced to a suitable reactor or autoclave and thereafter carbon monoxide and olefin are introduced to the reactor continuously until the catalyst is exhausted. In continuous processing, a similar reactor and procedure can be employed, but with the continuous withdrawal of reactant products and the continuous introduction of fresh or recycle catalyst.

Figure 2:
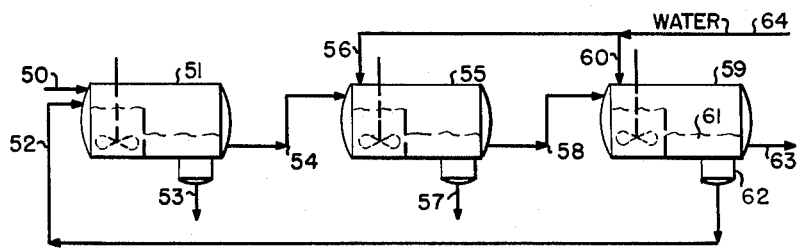

It has been discovered that if the stoichiometric molar quantity of water is all added to the complex in a single hydrolysis stage, it is not possible to recover all of the boron fluoride catalyst; only about 90–95% of the acid can be recovered using a single hydrolysis stage. It has been found that in a single hydrolysis stage, high localized concentrations of water tend to dilute the liberated boron fluoride catalyst rather than to hydrolyze the complex, so that incomplete hydrolysis occurs and relatively poor water utilization results. Again when synthesizing carboxylic acids having more than about 7 carbon atoms, the boron fluoride catalyst is partially soluble in the carboxylic acid product so that complete catalyst recovery cannot be achieved in a single hydrolysis step. It is one of the features of this invention, therefore, to attain complete recovery of catalyst by conducting the hydrolysis in a plurality of stages. At least two hydrolysis stages are required, although preferably three are employed. It is not economically desirable to employ greater than three stages although use of any desired number of hydrolysis stages is contemplated in the use of this invention. Other specific features are used in carrying out the staged hydrolysis as set forth in the following description of preferred embodiments of the invention and with reference to the attached drawing in which:

FIGURE 1 diagrammatically illustrates a flow plan of the complete synthesis process and, FIGURE 2 diagrammatically illustrates a preferred modification of the hydrolysis portion of the process illustrated in FIGURE 1.

Referring first to FIGURE 1, the numeral 1 identifies the first stage reactor into which olefin is supplied through line 2, carbon monoxide through line 3 and the hydrated boron fluoride catalyst through line 4. The reactor is equipped with a stirring means 5 so as to thoroughly agitate the reactor and to maintain a homogeneous mixture.

The reaction of olefin, carbon monoxide, and catalyst in reactor 1 is carried out at a temperature in the range of −4 to 302° F. under a carbon monoxide pressure of about 20–600 atmospheres. It is preferred to use long reaction periods of about 1–4 hours so as to attain complete conversion of the olefin feed to the complex with carbon monoxide and the boron fluoride catalyst. The precise nature of the complex is not presently understood but the complex exists as a homogeneous liquid either containing precursors of the final carboxylic acid product or holding the carboxylic acid product in some type of complex formation with the boron fluoride. The reaction described to form this complex is carried out with about 0.5 to 1.5 moles of the catalyst per mole of olefin feed. Preferably, a substantial excess of catalyst is maintained over that which is tied up in a complex with the olefin.

In accordance with this invention, the complex described is subjected to the treating steps illustrated in the drawing. In the first step of the process, the reactor products are removed from reactor 1 through line 6 and are mixed with a hydrocarbon diluent to permit separation of excess catalyst from the complex formed in the reaction. This can be accomplished using a simple orifice mixer, with a subsequent settling tank. Alternately, as illustrated in FIGURE 1, the hydrocarbon diluent can be mixed with the reactor products in a mixing and settling tank 7. Naphtha or other hydrocarbon diluent such as low molecular weight, normally liquid, non-reactive paraffins may be introduced to vessel 7 through line 8 for admixture with the reactor products in agitated zone 9. Preferably about 15–20 vol. percent of the hydrocarbon diluent is employed, although any desired amount may be used. This mixture can then overflow the weir 10 into the settling zone 11 to permit separation of a lower catalyst phase 12 having an interface in the sump portion of the mixer-settler tank. The separated catalyst may be withdrawn through line 13 for recycle and reuse in reactor 1.

In accordance with this invention, the complex, after separation of excess acid as described, is subjected to staged hydrolysis treatment in the three mixer and settler hydrolysis zones 14, 15 and 16. Referring to hydrolysis zone 14, for example, water introduced through line 17 is mixed with complex introduced to the mixer through line 18. The mixture of water and complex is mixed in zone 20 and is thereafter settled in zone 21 to permit withdrawal of separated catalyst as a lower phase through line 22. The separated complex is then passed through line 23 for mixture with additional water introduced into vessel 15 through line 24. Again, separated catalyst is withdrawn through line 25 and the remaining organic material is withdrawn from vessel 15 through line 26 for introduction into hydrolysis vessel 16. Water is similarly added to vessel 16 through line 27 and separated catalyst is recovered from the settling portion of reactor 16 through line 28.

The catalyst recovered from lines 13, 22, 25 and 28 as described may be recycled and returned to reactor 1. The remaining organic material in the last hydrolysis zone 16 is withdrawn through line 29 and introduced to a water wash zone 30. The product is washed with water so as to extract and recover from the carboxylic acid product all remaining traces of the boron fluoride catalyst. Any desired water washing arrangement may be used for this purpose, although provision should be made for at least about 10 contacting stages. As illustrated in the drawing this can be carried out in a vertical water washing tower 30 in which water is introduced at the top through line 31 for countercurrent gravity flow with the carboxylic acid introduced at the bottom of the tower. Tower 30 may be provided with packing material 32 and can be provided with agitators in areas between the separated packing for effective countercurrent multi-stage contacting. The washed carboxylic acid product may then be removed from the tower through line 33. This product of the process may then be subjected to fractionation or other desired purification and finishing stages.

The water removed from the bottom of tower 30 through line 34 will contain recovered boron fluoride catalyst. This water is therefore used to supply the hydrolysis needs of the hydrolysis zones 14, 15, and 16, insuring complete retention of all boron fluoride catalyst in the system described.

As indicated, in a balanced operation, at least one mole of water must be introduced through line 31 and subsequently used in the hydrolysis steps of the process for each mole of carboxylic acid product. Distribution of the amount of water among the three hydrolysis sections 14, 15 and 16 is not particularly critical and about equal proportions of water may be supplied to each of the hydrolysis zones.

The conditions maintained in the hydrolysis zones described are not particularly critical. In the mixing step it is necessary to secure adequate admixture of the complex in the hydrolysis medium. This is desirably obtained by employing rather mild agitation using about five minutes to as much as one hour to achieve equilibrium hydrolysis conditions. Thereafter the carboxylic acid product may be separated in a quiescent settling zone using a settling time up to about one hour. Particularly when inert paraffin diluent as described is used in the process, the settling occurs readily at settling rates of about one inch per minute. In general then, the process described can be designed so as to provide combined holding periods in the mixing and settling zones referred to of about one hour for each hydrolysis stage.

It is important that the hydrolysis be conducted at a temperature below about 150° F. Hydrolysis can then be carried out at ambient temperatures, although interstage coolers may be used, if required, so as to maintain the temperature below 150° F. at all times, and to compensate for the heat of reaction due to hydrolysis.

FIGURE 2 of the drawing shows a preferred embodiment of the invention, particularly adapted for the production of carboxylic acids having more than about 7 carbon atoms. Such high molecular weight carboxylic acids can dissolve substantial amounts of boron fluoride catalyst ranging up to about 10 weight percent. The modification of FIGURE 2 of the drawing is particularly desirable as a means to improve stripping of acid catalyst from the carboxylic acid product.

Referring to FIGURE 2, line 50 corresponds to line 18 of FIGURE 1 and is used to introduce the complex to be hydrolyzed into a first hydrolysis zone 51. The complex is hydrolyzed in zone 51 with dilute boron fluoride catalyst, recovered as described subsequently, and introduced to hydrolysis zone 51 through line 52. Hydrolysis of the complex in zone 51 results in separation of boron fluoride catalyst for removal through line 53 for return to reactor 1. Complex is withdrawn from vessel 51 through line 54 and passed to the 2nd hydrolysis zone 55 where it is mixed with water introduced through line 56. Again, acid separated as a result of this hydrolysis can be recovered through line 57 for recycle to reactor 1. The upper complex phase separated from the catalyst is withdrawn from zone 55 through line 58 for introduction to the third hydrolysis step 59 and for admixture with additional water introduced through line 60. The operation is such that hydrolysis of the complex is completed and the separated carboxylic acid is washed with water in zone 59 so as to remove substantially all of the catalyst from the carboxylic acid. This catalyst is separated from the carboxylic acid in the settling zone 61 for withdrawal of the separated catalyst through the sump portion 62 and for recycle to hydrolysis zone 51 through line 52. The separated carboxylic acid may be withdrawn through line 63 and can be passed to distillation and product finishing or preferably can first be subjected to additional water washing as described in connection with FIGURE 1. In the event additional water washing is employed, the water employed in this washing step is recovered for introduction through line 64 for use in the hydrolysis zones 55 and 59.

In using the process in FIGURE 2, for balanced operation one mole of water for each mole of carboxylic acid product will be introduced through line 64. Preferentially, most of this water will be passed through line 60 and used in hydrolysis zone 59 with the remaining minor portion of the water being passed through line 56 and used in hydrolysis zone 55. Thus, it is preferred that about 75% of the total water of hydrolysis is used in the last hydrolysis step (vessel 59) with about 25% of water being used in the second hydrolysis step (vessel 55). When carried out in this way the acid catalyst recovered from hydrolysis zone 59 will be diluted with water to provide a composition containing about 2–4 moles or more of water per mole of boron fluoride. This composition may be best described as constituting a dilute solution of boron fluoride and its hydrolysis products. As illustrated in FIG. 2 of the drawings, it is this dilute solution of boron fluoride which is effectively used to secure hydrolysis of the complex in the first hydrolysis zone 51. Optionally, however, the dilute boron fluoride solution may be recycled in part to the second hydrolysis stage as well as the first hydrolysis stage.

Extending the foregoing description of the preferred embodiments of this invention, the following examples illustrate specific features of the invention.

In a first experiment, a $C_9$ olefin constituting a propylene trimer was reacted with carbon monoxide and a catalyst constituting $BF_3 \cdot 2H_2O$. The complex was formed at a temperature of about 125° F. under a carbon monoxide pressure of about 1500 p.s.i.g., using an excess of the boron fluoride dihydrate catalyst. The complex formed was allowed to settle for several days at ambient temperatures and an unreacted catalyst phase was formed and was removed as the more dense layer. Thereafter the remaining complex was heated to about 130° F. and allowed to settle. Under these conditions, no additional catalyst recovery was obtained. However, when 500 grams of the homogeneous acid complex were mixed with about 70 grams of a $C_7$ paraffinic naphtha fraction and allowed to settle for about one hour at 130° F., 13.6 grams of $BF_3 \cdot 2H_2O$ catalyst separated as the heavier phase. This example therefore shows the improvement in settling obtainable by using paraffinic diluent as described.

In a second experiment conducted to demonstrate the operability of the hydrolysis system illustrated in FIG. 1 of the drawings, a complex was formed with isobutylene, carbon monoxide and $BF_3 \cdot 2H_2O$ catalyst. The reactor effluent of the complex formation step was then diluted with about 10 weight percent of normal hexane, and unreacted excess $BF_3 \cdot 2H_2O$ catalyst was settled and removed. The remaining complex was then hydrolyzed in three stages using water that had been used to wash an equivalent amount of crude acid resulting from such hydrolysis. Thus the water of hydrolysis used had been obtained by contacting crude carboxylic acid in three equilibrium stages. This water was found to have a pH less than one, indicating the presence of small amounts of $BF_3$ and/or its hydrolysis products. The weight of hydrolysis water used represented a 10 mole percent excess over that required to hydrolyze the complex. Hydrolysis was carried out batchwise in three separate stages, employing a five minute mixing period and a fifteen minute settling period in each stage. Boron fluoride catalyst resulting from the hydrolysis was separated in each stage. After adjusting for the excess water, added during hydrolysis, the weight of $BF_3 \cdot 2H_2O$ recovered was equal to that charged as complex. The recovered acid was then recycled to the synthesis stage and the catalyst was found to have the same activity and selectivity as fresh $BF_3 \cdot 2H_2O$ catalyst.

In a similar manner, a dilute regenerated $BF_3$ catalyst was prepared having the composition $BF_3 \cdot 2.8H_2O$. 100 grams of the complex formed by reaction with a propylene trimer, carbon monoxide, and $BF_3 \cdot 2H_2O$ (free of excess $BF_3 \cdot 2H_2O$ catalyst) were diluted with about 10 weight percent of a $C_7$ paraffinic naphtha fraction, and unreacted excess $BF_3 \cdot 2H_2O$ catalyst was settled and removed. The remaining complex was then admixed with 7.6 grams of the dilute regenerated catalyst. Upon settling, the mixture yielded 11.1 grams of hydrated boron fluoride catalyst suitable for direct reuse in the synthesis step. This example, therefore, shows the operability of using dilute regenerated catalyst to hydrolyze the carbon monoxide-olefin-catalyst complex.

What is claimed is:

1. In a process for synthesizing carboxylic acids by a first step formation of a complex of carbon monoxide, a $C_3$ to $C_{20}$ monoolefin and a hydrated boron fluoride catalyst and a second step hydrolysis of said complex, the improvement comprising: hydrolyzing said complex in a plurality of hydrolysis zones at a temperature below about 150° F. in which one mole of water per mole of olefin in said complex is employed to effect hydrolysis.

2. The process of claim 1 in which said complex is separated from excess catalyst by admixture with a liquid, non-reactive hydrocarbon diluent present in a concentration of up to about 25 volume percent.

3. In a process for synthesizing carboxylic acids by formation of a complex of carbon monoxide, a $C_3$ to $C_{20}$ monoolefin and a hydrated boron fluoride catalyst and hydrolysis of said complex, the improvement which comprises hydrolyzing said complex at a temperature below about 150° F. with aqueous hydrolysis medium in a first hydrolysis step and recovering reconstituted boron fluoride catalyst and crude carboxylic acid product, and thereafter contacting said crude carboxylic acid product with water in at least one additional contacting stage and recovering carboxylic acid product and dilute boron fluoride catalyst which is used as said aqueous hydrolysis medium in the first hydrolysis step, wherein the entire hydrolysis procedure is conducted using one mole of water per mole of said complex to effect hydrolysis.

4. A process for synthesizing carboxylic acids comprising the steps:

(a) reacting carbon monoxide, a $C_3$ to $C_{20}$ monoolefin and a hydrated boron fluoride catalyst at a temperature of about −4 to 302° F. and a pressure of about 10 to 600 atmospheres, whereby a complex of said reactants is formed;

(b) separating said complex from excess unreacted catalyst;

(c) admixing the separated complex with aqueous medium in a first hydrolysis step and separating a first carboxylic acid product stream and a first recovered catalyst stream;

(d) admixing said first carboxylic acid product stream with aqueous hydrolysis medium in at least one additional hydrolysis step and separating a second carboxylic acid product stream and a second recovered catalyst stream; and (e) recycling said first and second recovered catalyst streams to step (a) of said process, each and all of said hydrolysis steps being conducted at a temperature below about 150° F. and wherein the entire hydrolysis procedure is conducted using one mole of water per mole of said complex to effect hydrolysis.

5. The process defined in claim 4 in which said complex is separated from excess catalyst in step (b) by admixture with a liquid, non-reactive hydrocarbon diluent present in a concentration of up to about 25 volume percent and said second carboxylic acid product stream is admixed with water and thereafter an aqueous medium is separated from said admixture and is used as said aqueous hydrolysis medium.

6. A process for synthesizing carboxylic acids comprising the steps:
 (a) reacting carbon monoxide, a $C_3$ to $C_{20}$ monoolefin and a hydrated boron fluoride catalyst containing about 2 to 2.5 moles of water per mole of boron fluoride at a temperature of about −4 to 302° F. and at a pressure of about 10 to 600 atmospheres, whereby a complex of said reactants is formed;
 (b) separating said complex from excess unreacted catalyst;
 (c) admixing the separated complex with aqueous hydrolysis medium in a first hydrolysis step and separating a first carboxylic acid product stream and a first recovered catalyst stream;
 (d) admixing said first carboxylic acid product stream with aqueous hydrolysis medium in at least one additional hydrolysis step and separating a second carboxylic acid product stream and a second recovered catalyst stream;
 (e) subsequently admixing said second carboxylic acid product stream with water and separating a dilute aqueous solution of acid catalyst; and
 (f) using said dilute aqueous solution of acid catalyst as said aqueous hydrolysis medium in said first hydrolysis step, each and all of said hydrolysis steps being conducted at a temperature below about 150° F., and wherein the entire hydrolysis procedure is conducted using one mole of water per mole of said complex in lined out operation to recover hydrated boron fluoride catalyst having the same constitution as a catalyst employed in step (a).

References Cited by the Examiner

FOREIGN PATENTS 603,709    8/1960    Canada.

CHARLES B. PARKER, *Primary Examiner.*

IRVING MARCUS, *Examiner.*

A. H. SUTTO, R. L. RAYMOND, *Assistant Examiners.*